US012500875B2

(12) United States Patent
Awasthi et al.

(10) Patent No.: US 12,500,875 B2
(45) Date of Patent: Dec. 16, 2025

(54) SYSTEM AND METHOD FOR TWO WAY TRUST BETWEEN AN EXTERNAL KEY MANAGEMENT SYSTEM AND A CLOUD COMPUTING INFRASTRUCTURE

(71) Applicant: Oracle International Corporation, Redwood Shores, CA (US)

(72) Inventors: Apurv Awasthi, Woodinville, WA (US); Frederick Anthonisamy Bosco, Redmond, WA (US); Bharat Shivram, Delhi (IN); Madhu Manjunath, Bengaluru (IN); Deepak Kumar, Bengaluru (IN); Raj Miglani, Lucknow, IN (US); Akshay Mall, Lucknow (IN); Mayank Bajpai, Bengaluru (IN); Jun Tong, Seattle, WA (US); Mukesh Shah, Bengaluru (IN); Mauruthi Geetha Mohan, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 9 days.

(21) Appl. No.: 18/764,683

(22) Filed: Jul. 5, 2024

(65) Prior Publication Data
US 2025/0015977 A1 Jan. 9, 2025

Related U.S. Application Data

(60) Provisional application No. 63/525,105, filed on Jul. 5, 2023.

(51) Int. Cl.
*H04L 9/40* (2022.01)
*H04L 9/08* (2006.01)

(52) U.S. Cl.
CPC .......... *H04L 63/062* (2013.01); *H04L 9/0825* (2013.01); *H04L 9/0866* (2013.01); *H04L 9/0894* (2013.01)

(58) Field of Classification Search
CPC .................................................. H04L 63/062
See application file for complete search history.

(56) References Cited

U.S. PATENT DOCUMENTS 9,569,630 B2   2/2017   Cabrera et al.
10,956,600 B2  3/2021   Ye et al.
(Continued)

FOREIGN PATENT DOCUMENTS

WO   2019/212773 A1   11/2019

OTHER PUBLICATIONS

"Cloud External Key Manager," Retrieved from https://cloud.google.com/kms/docs/ekm, Mar. 4, 2024, pp. 5.
(Continued)

*Primary Examiner* — Bradley W Holder
(74) *Attorney, Agent, or Firm* — Invoke

(57) ABSTRACT

An identity service in a cloud environment is communicatively coupled to a proxy key vault in the cloud environment and to an external key manager (EKM) located outside of the cloud environment. The identity service receives a token request for a communication credential from the proxy key vault and verifies the request based on a client credential associated with the proxy key vault. The identity service generates the client credential and signs the communication credential with a private key associated with the EKM. The identify service transmits the signed communication credential to the proxy key vault. The communication credential can be used to substantiate cryptographic operation requests to the EKM.

20 Claims, 13 Drawing Sheets

(56) References Cited

U.S. PATENT DOCUMENTS

| | | | |
|---|---|---|---|
| 11,575,508 | B2 | 2/2023 | Anand et al. |
| 11,652,616 | B2 | 5/2023 | Zee et al. |
| 2017/0006119 | A1 | 1/2017 | Pogrebinsky et al. |
| 2019/0132299 | A1* | 5/2019 | Tucker .............. H04W 12/0431 |
| 2019/0354692 | A1 | 11/2019 | Thoram et al. |
| 2021/0036851 | A1* | 2/2021 | Villapakkam ......... G06F 21/602 |
| 2021/0218722 | A1* | 7/2021 | Gaylor .................. H04L 9/0894 |
| 2021/0368514 | A1 | 11/2021 | Xing |
| 2022/0271929 | A1* | 8/2022 | Villapakkam ............. H04L 9/14 |

OTHER PUBLICATIONS

"External Key Management for AWS by T-Systems, AWS Premier Consulting and Security Competency Partner," Retrieved from https://www.t-systems.com/resource/blob/565764/35be2fbd609320ec590eea9c5fbdf592/DL-Flyer-External-Key-Managment-for-AWS-T-Systems-EN-08-2023.pdf, Retrieved on Jul. 30, 2024, pp. 2.

"External key stores," Retrieved from https://docs.aws.amazon.com/kms/latest/developerguide/keystore-external.html, Mar. 4, 2024, pp. 16.

"Integrating Skyhigh CASB On-Prem Proxy with aKey Management Server," Retrieved from https://success.skyhighsecurity.com/Skyhigh_CASB/Skyhigh_CASB_Settings/On-Prem_Proxy/zIntegrating_MVISION_Cloud_On-Prem_Proxy_with_a_Key_Management_Server, Sep. 3, 2021, pp. 3.

"Key Management Interoperability Protocol (KMIP)," Retrieved from https://www.encryptionconsulting.com/education-center/kmip/#:~:text=KMIP%20is%20an%20extensible%20communication,by%20simplifying%20encryption%20key%20management., Retrieved on Jul. 30, 2024, pp. 5.

"Sepior's Cloud Encryption Technology Now Supports Key Management Interoperability Protocol (KMIP)," Sepior, Nov. 10, 2017, pp. 4.

"StorMagic-SvKMS-Data-Sheet," Retrieved from https://stormagic.com/pdf/data-sheet/StorMagic-SvKMS-Data-Sheet.pdf, 2023, pp. 4.

Microsoft Learn, "Azure Key Vault REST API reference", Apr. 19, 2023, Available online at <https://learn.microsoft.com/en-us/rest/api/keyvault/>, 12 pages.

Microsoft Learn: "Connect to a Key Vault via private endpoint—Code Samples", Jul. 6, 2022, Available online at <https://learn.microsoft.com/en-us/samples/azure/azure-quickstart-templates/key-vault-private-endpoint/>, 5 pages.

* cited by examiner

SYSTEM AND METHOD FOR TWO WAY TRUST BETWEEN AN EXTERNAL KEY MANAGEMENT SYSTEM AND A CLOUD COMPUTING INFRASTRUCTURE

BENEFIT CLAIMS; RELATED APPLICATIONS; INCORPORATION BY REFERENCE

This application claims the benefit of U.S. Provisional Patent Application 63/525,105, filed Jul. 5, 2023, that is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to key management in cloud computing environments that provide cryptography services. In particular, the present disclosure relates to external key management and use for cloud computing environment customers and a two-way trust model for external key management and use.

BACKGROUND

A cloud computing environment can be used to provide access to a range of complementary cloud-based components, such as software applications or services, that enable organizations or enterprise customers to operate their applications and services in a highly available hosted environment.

Some cloud computing environments provide cryptography services that allow a customer to use cloud services in combination with their data in a secure manner. A key management service in the cloud computing environment manages encryption keys for a customer and controls how those keys can be used to access the customer's data stored within the cloud environment.

In some instances, the customer's encryption keys are stored within the cloud environment for use by the key management service and other cloud services. However, some cloud customers have regulatory needs directed to maintaining the provenance and access to encryption keys that are used to secure their data. Generally, such entities require their encryption keys to be stored outside of the cloud environment.

The approaches described in this section are approaches that could be pursued, but not necessarily approaches that have been previously conceived or pursued. Therefore, unless otherwise indicated, one should not assume that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment, and they mean at least one. In the drawings.

DETAILED DESCRIPTION

Figure 1:
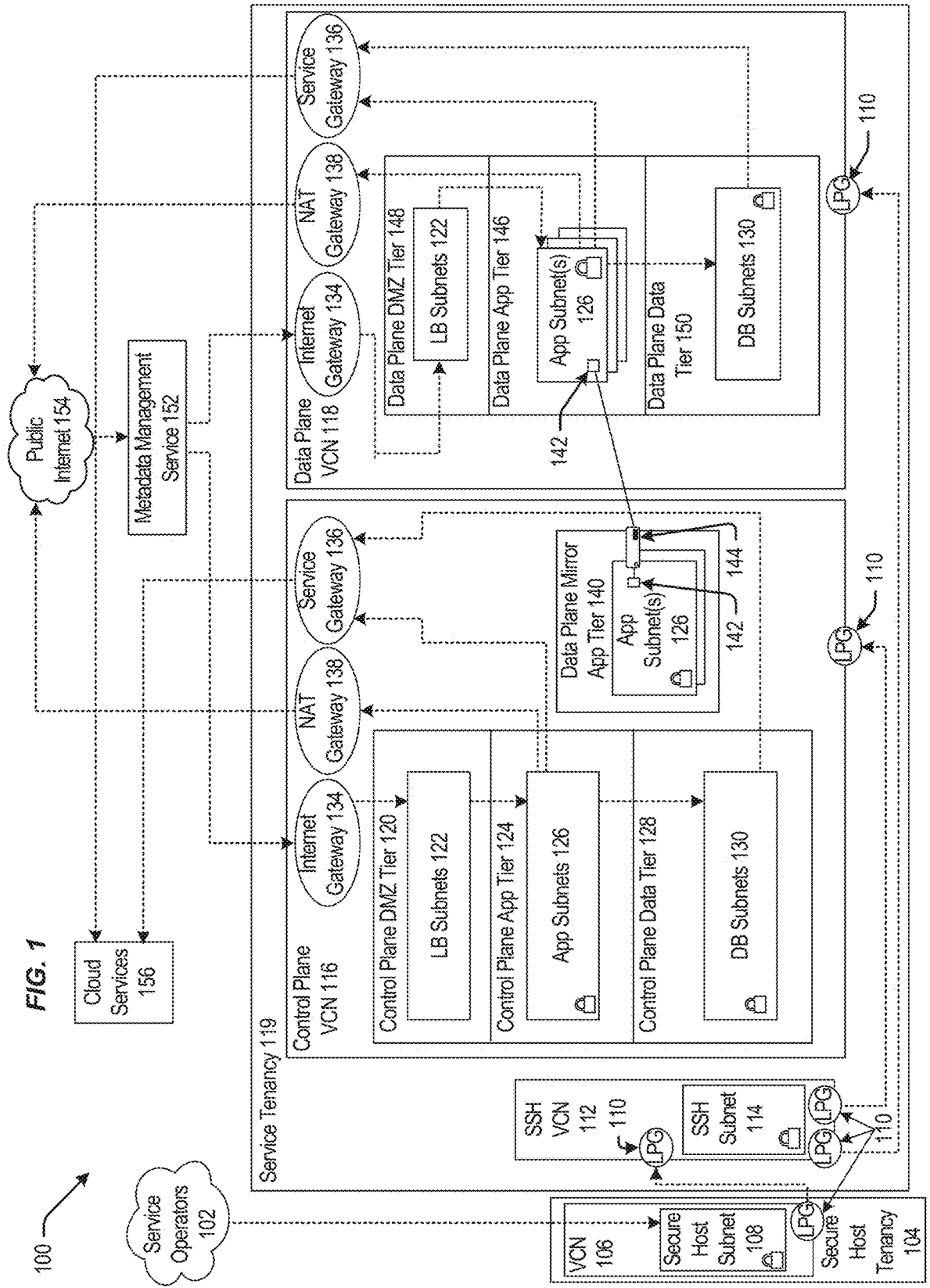
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CLOUD COMPUTING TECHNOLOGY
3. COMPUTER SYSTEM
4. KEY MANAGEMENT SYSTEM ARCHITECTURE
5. CONFIGURING AND USING A KEY MANAGEMENT SERVICE
6. EXAMPLE EMBODIMENT
7. MISCELLANEOUS; EXTENSIONS

1. GENERAL OVERVIEW

One or more embodiments include a key management service (KMS) in a cloud computing environment that uses cryptographic keys stored external to the cloud computing environment. The KMS includes a proxy key vault that is coupled via an authenticated communication path to an external hardware device operating an external key manager (EKM) that stores an external cryptographic key. The proxy key vault includes an external key manager (EKM) proxy that uses the authenticated communication path to communicate requests for cryptographic operations needing the external cryptographic key to the EKM.

One or more embodiments include an identity service that provides a two-way trust model for communications between the EKM proxy and the EKM. The identity service can include a resource application associated with the EKM and a client application mapped to the resource application and associated with the proxy key vault. The resource application stores a private/public key pair. The client application is associated with a client credential that is provided to the proxy key vault.

The EKM proxy requests a communication credential from the identity service using the client credential of the client application associated with the proxy key vault. The identity service verifies that the client credential is associated with both the requesting EKM proxy and the client application associated with the proxy key vault of the EKM proxy. Upon verification, the identity service generates the communication credential and signs the communication credential with the private key held by the resource application.

When the EKM proxy communicates with the EKM, for example, to request a cryptographic operation, the EKM proxy provides the communication credential to the EKM along with the request. The EKM obtains and uses the public key from the identity service to verify the communication credential before performing the requested cryptographic operation.

One or more embodiments described in this Specification and/or recited in the claims may not be included in this General Overview section.

2. CLOUD COMPUTING TECHNOLOGY

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming the entity's own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling (OS), middleware, and/or application deployment, such as on self-service virtual machines. The self-service virtual machines can be spun up on demand.

In some examples, IaaS provisioning may refer to acquiring computers or virtual hosts for use, even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on one another, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure that will deploy the code may first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

Figure 2:
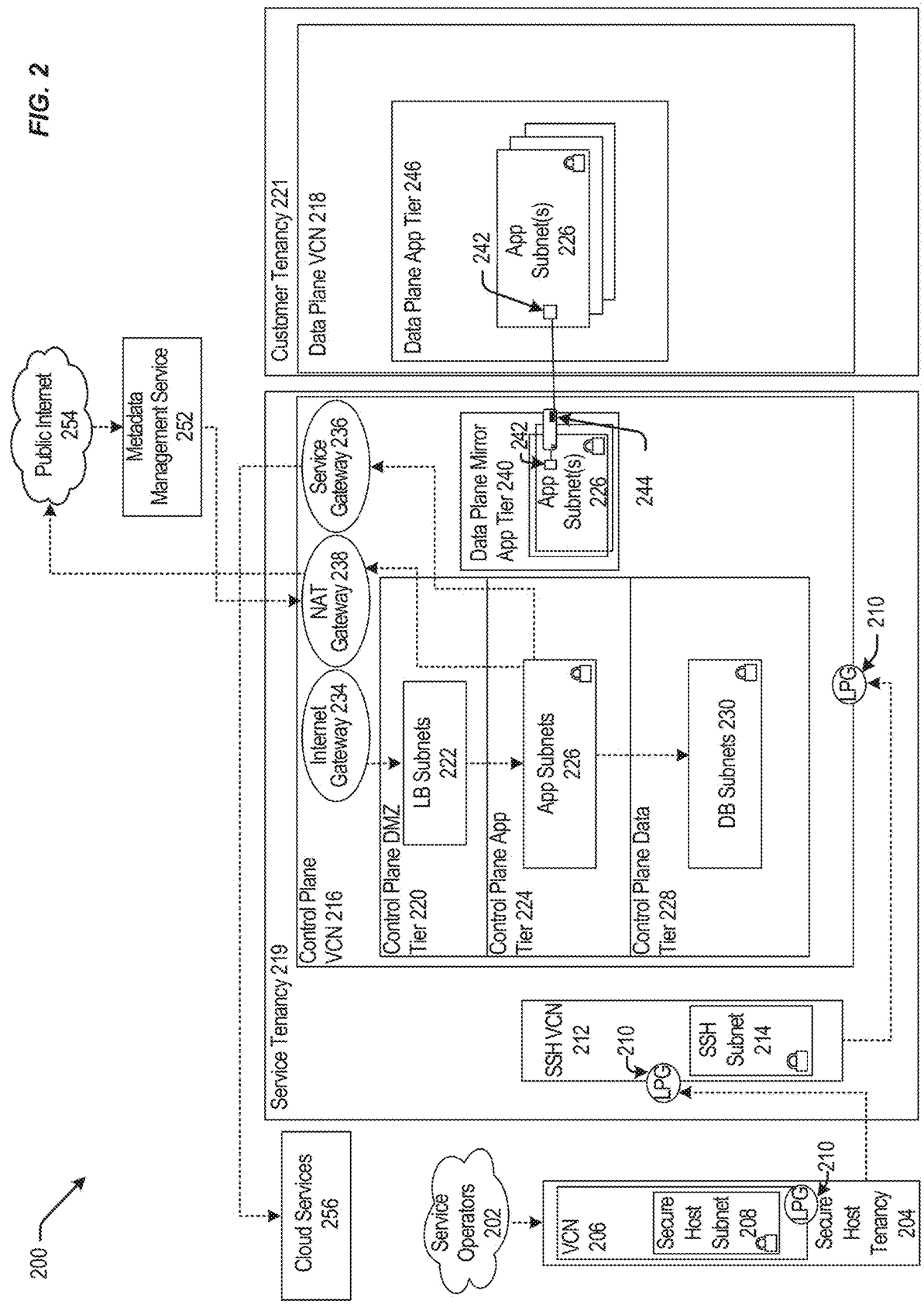

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
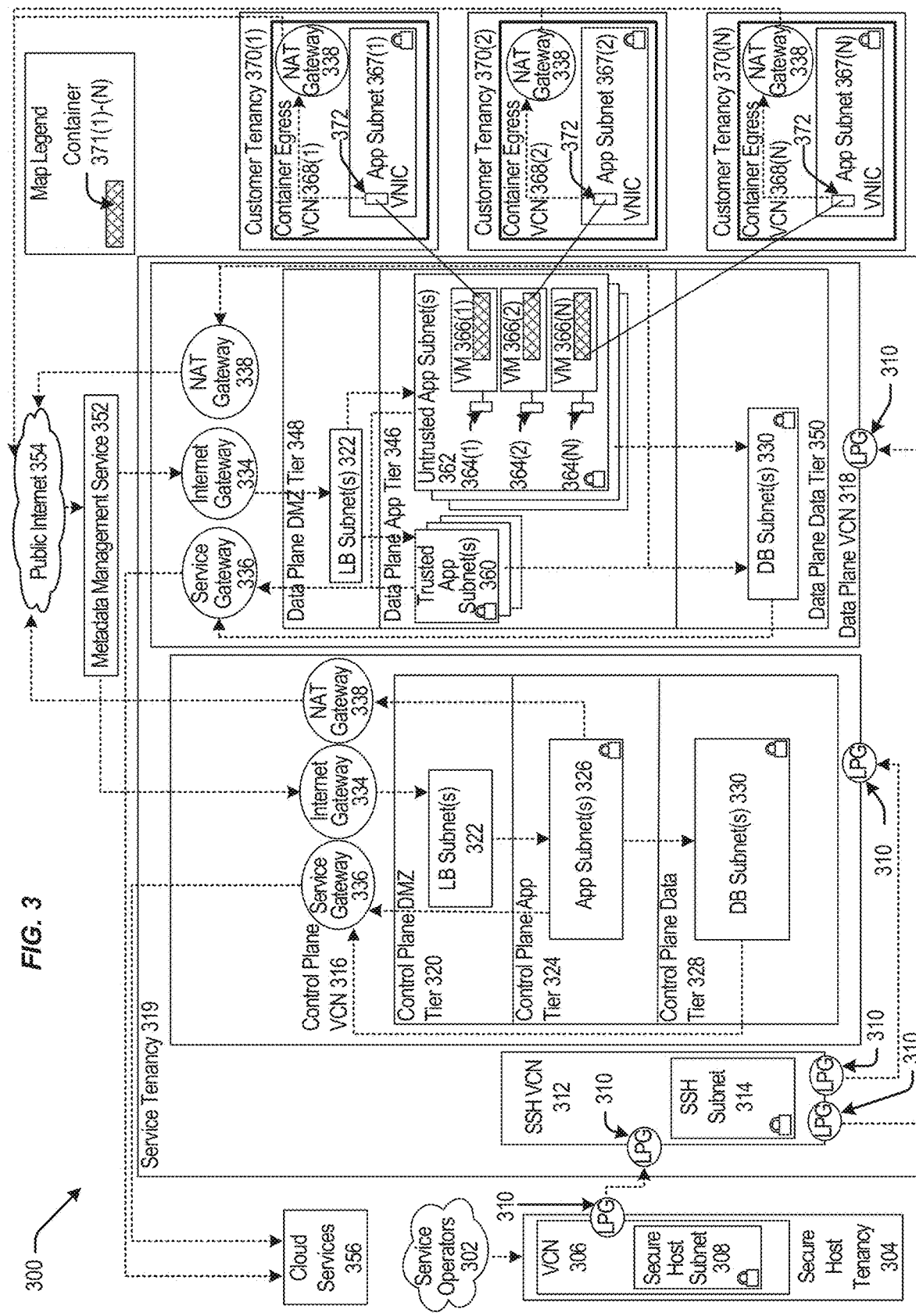

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
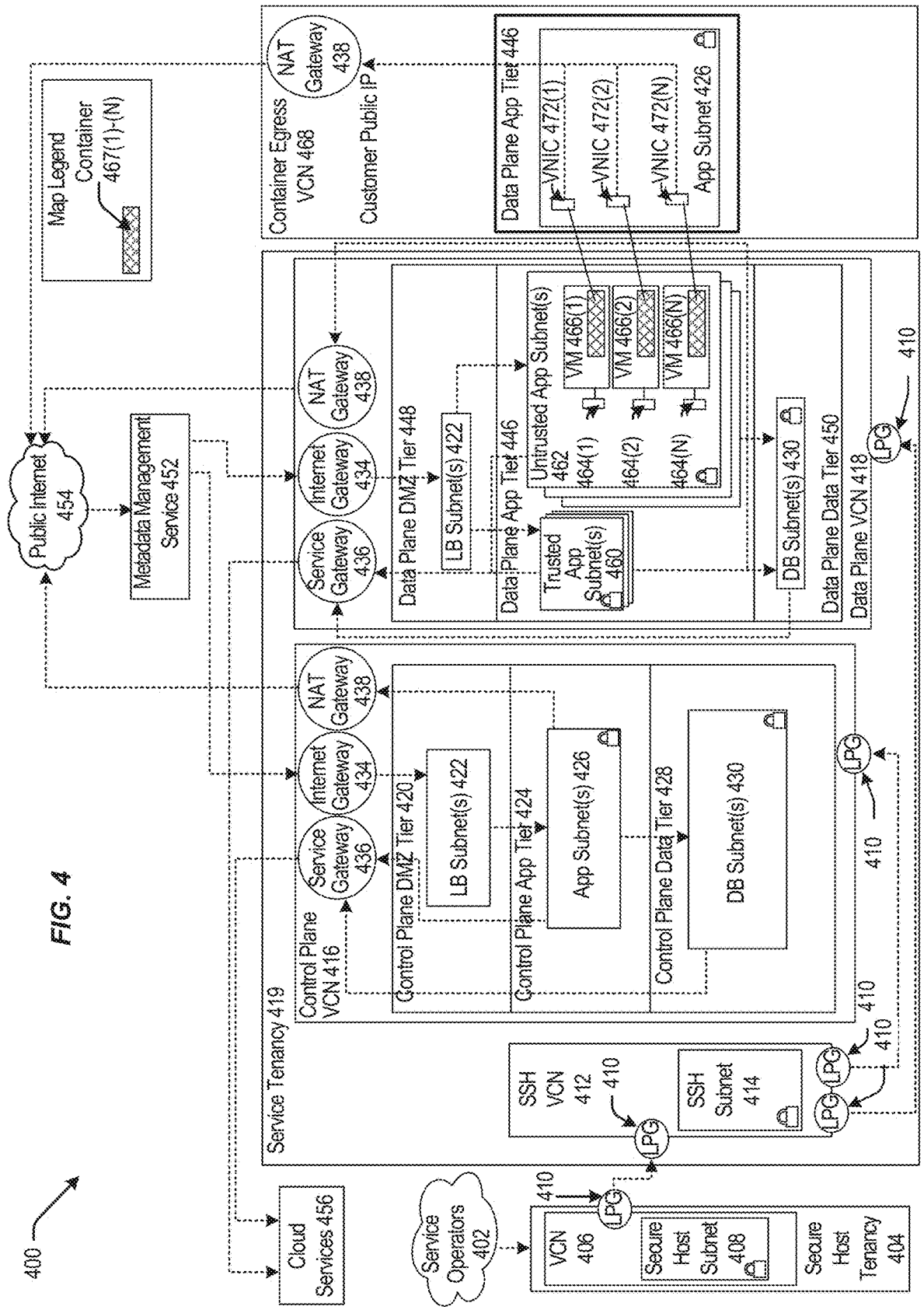

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including, but not limited to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including, but not limited to, a private cloud, a public cloud, and a hybrid cloud. In a private cloud, network resources are provisioned for exclusive use by a particular group of one or more entities; the term "entity" as used herein refers to a corporation, organization, person, or other entity. The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource when the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset when the tenant and the particular application, data structure, and/or dataset are associated with a same tenant ID.

As an example, each database implemented by a multi-tenant computer network may be tagged with a tenant ID. A tenant associated with the corresponding tenant ID may access data of a particular database. As another example, each entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for each tenant, a set of applications that the tenant is authorized to access. For each application, a list of tenant IDs of tenants authorized to access the application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. COMPUTER SYSTEM

Figure 5:
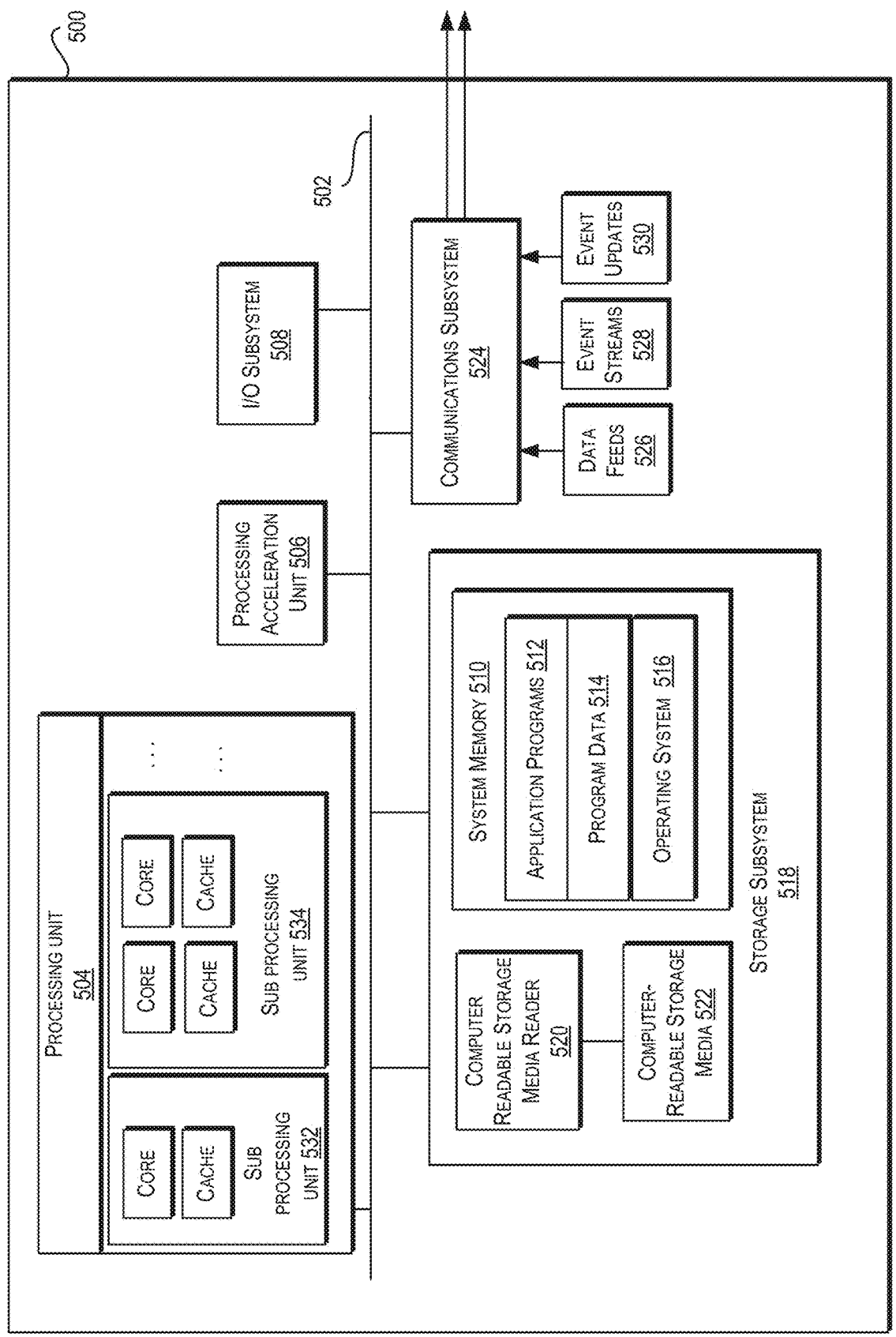
FIG. 5 is a hardware system in accordance with one or more embodiments.

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with each other as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures may be implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include medical imaging input devices such as computed tomography, magnetic resonance imaging, position emission tomography, or medical ultrasonography devices. User interface input devices may also include audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices may include, without limitation, a variety of display devices that visually convey text, graphics and audio/video information, such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.). Different types of RAM configurations may be provided, including a static random access memory (SRAM), a dynamic random access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams may include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), click-stream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. KEY MANAGEMENT SYSTEM ARCHITECTURE

Figure 6:
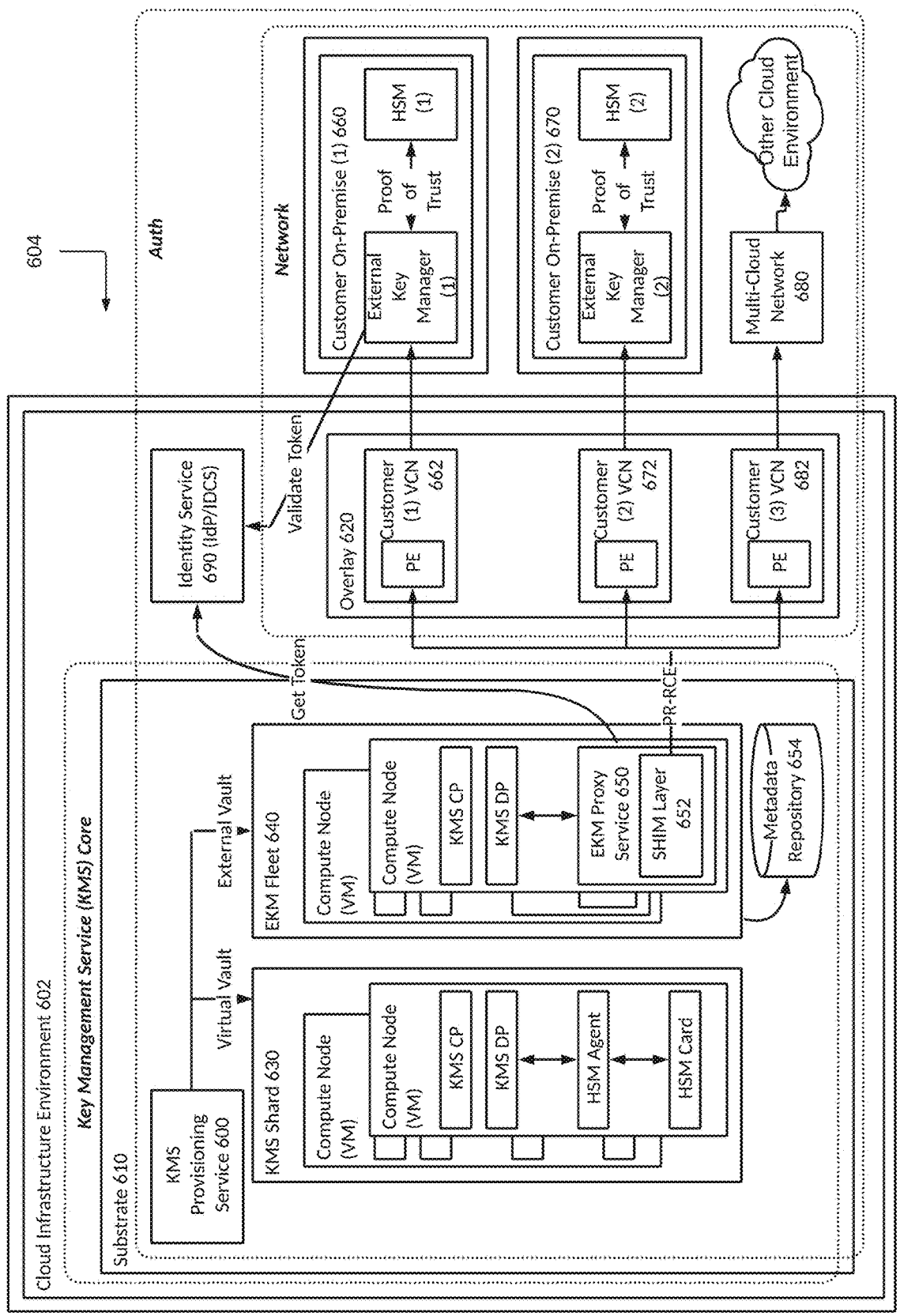
FIG. 6 illustrates a key management service for use with a cloud infrastructure environment in accordance with one or more embodiments.

FIG. 6 illustrates a system 604 in accordance with one or more embodiments. As illustrated in FIG. 6, system 604 includes a key management service (KMS) provisioning service 600, operating within a key management service substrate 610 of a cloud computing infrastructure environment 602.

The KMS provisioning service 600 includes and provisions one or more KMS shards 630. A KMS shard may contain one or more compute nodes and/or virtual machines. To support external key management, a separate KMS shard may include an additional fleet of compute nodes or virtual machines operating as an external key manager (EKM) fleet 640 and running a stack or instance of KMS and communicating with external key managers. A KMS shard may have a datastore that is isolated from datastores on other shards.

A KMS shard may include one or more vaults. A vault is a logical entity that stores and manages encryption keys and secrets to securely access resources. The system may include a "virtual" vault that shares the same KMS-managed hardware security module (HSM) partition as some other virtual vaults. The system may include a "virtual private" vault that has an HSM partition dedicated to one tenant for the tenant's exclusive use. The system may include a proxy key vault, or "external" vault. When used in a cloud computing environment, a proxy key vault does not consume a partition in the cloud computing environment-managed HSM but rather acts as a logical entity to hold references of keys stored externally to the cloud computing environment KMS. A KMS provisioning service 600 uses a vault placement logic that places a vault in a shard based upon the vault type. Alternatively, proxy key vaults can be explicitly placed into external fleets.

A hardware security module is a physical computing device that safeguards and manages digital keys as well as performs encryption and decryption functions for digital signatures, strong authentication, and other cryptographic functions. Examples of such hardware security modules can be provided in the form of a plug-in card or an external device that attaches directly to a computer or network server.

In one or more embodiments, a customer on-premise environment 660, 670 includes an external key manager (EKM). An EKM may be an application that holds and manages an external key. An EKM may allow granular access control to the external key and configure security policies that integrate with an HSM. An EKM may be operative to perform cryptographic operations, such as encryption and decryption. The encryption key can be backed by an HSM. The encryption key is not transferred to the cloud environment but is instead retained and used at the customer's on-premise environment when needed to encrypt or decrypt customer data stored within the cloud environment and used by cloud-based applications or services operating thereon.

In one or more embodiments, the EKM fleet 640 runs in a proxy key vault and operates an EKM proxy service 650. The EKM proxy service 650 operates as a proxy between the KMS that receives requests from cloud services directed to accessing a secured data vault within the cloud environment and a customer's on-premise EKM in response to an authorized request to access the data vault stored within the cloud environment and secured by the external key in the EKM. The EKM proxy service 650 acts as a single point of contact to reach the external key managers at customer on-premise environments 660, 670 via an overlay 620 and virtual cloud networks (VCN) 662, 672 that enable access to those on-premise environments. The EKM proxy service may connect to an EKM via a private endpoint with reverse connection functionality (PE-RCE) in the customer's virtual cloud network (VCN) in the overlay 620. A private endpoint is a private IP address within the customer's VCN that is used to access a given service within a cloud computing environment. A PE-RCE is a private endpoint that enables the cloud service provider to privately access endpoints in the customer's network. The reverse connection functionality establishes private connection from the KMS substrate 610 to the customer VCN. Traffic originating from the private endpoint IP address in the customer's VCN is allowed to flow from the EKM Fleet to the EKM. The private endpoint may have an RCE IP address usable for service-to-customer traffic but will not have an address accepting unsolicited traffic from customers.

The key management service acts as a passthrough, directly taking the external key manager as a dependency on the data plane path of the KMS. The KMS translates data plane (DP) calls into outbound calls to an external key manager. Network connectivity technologies, such as co-location and FastConnect, provide a level of predictiveness in terms of latency. The use of a fleet explicit to external key management provides isolation of traffic (rate limiting) and security since the EKM proxy service integrates with external sources. The EKM fleet may have a datastore isolated from other shards.

A vault, when created, has one management domain name service (DNS) public endpoint and one cryptographic public DNS endpoint. The DNS name of a vault may serve as an identifier of the vault, e.g., to a DNS resolver. The KMS redirects traffic directed to a proxy key vault to the EKM Fleet. A DNS resolver (not shown) receives requests for cryptographic operations and identify the IP address of the requested vault based on the DNS name included in the request. The EKM proxy service may communicate with an external key manager via a provider-agnostic application program interface, library, or shim layer 652 (referred to herein in some embodiments as a shim). The shim layer 652 allows the KMS to request cryptographic operations, e.g., encryption or decryption, from the EKM using the same API call regardless of the third-party performing the operations at the EKM or the type hardware security module (HSM) that the customer may be using on-premise. The shim layer allows integration of third-party identity providers or identity management processes that control the authentication and authorization of the external key manager proxy service in communicating with the customer's on-premise external key manager. The shim layer abstracts the vendor-specific details. In one or more embodiments, the shim layer 652 uses a generic or open API specification that can be implemented by vendors and/or the customer to extend support to the external key management feature. External key manager vendors can make APIs available to support external key manager use cases.

The data plane interfaces for the KMS lets downstream services integrate seamlessly with vaults in the KMS without needing to know the type of vault that a downstream service is communicating with.

In one or more embodiments, the EKM proxy service 650 is provided, for example, as a docker service that acts as a sole entity making outbound connections to external key managers. As further described below, in accordance with an embodiment, example responsibilities of the EKM proxy service include the following: initiating and maintaining connections to external key managers and persisting metadata related to an external key manager in an EKM metadata repository 654; persisting metadata related to external key references and how the external key references map to external keys; exposing private endpoints as resources; and running workflow related to enable endpoint creation/deletion.

The EKM proxy may communicate with an identity service 690. In one or more embodiments, the identity service 690 provides identity and access management capabilities to support authorization operations between an EKM proxy and an EKM. The identity service may support two-legged client-credential-grant OAuth2 protocols. The identity service may include a resource application, created by the customer, that is mapped to an EKM of the customer and holds a public/private key pair. The identity service may include a client application corresponding to a vault and mapped to the resource application. The client application issues a client credential to the EKM proxy of the corresponding vault. The EKM proxy maintains the client credential and uses the client credential when communicating with the EKM.

In one or more embodiments, for multi-cloud integrations, the private endpoint that the key management service creates is placed in the customer-owned multi-cloud VCN 682 that is peered to other cloud service providers (CSPs) via a multi-cloud network infrastructure (MCN) 680.

In one or more embodiments, the system 604 includes a cryptographic interface for use with the KMS that is agnostic to the location of an encryption key. That is, requests to the KMS for a cryptographic operation, e.g., via an API, are the same regardless of whether the key is stored on a cloud service provided HSM or on a customer on-premise HSM.

In one or more embodiments, a customer owns an on-premise environment that is accessible via the customer's private endpoint (PE) within the customer's virtual cloud network (VCN) and that together form part of the customer's tenancy in a cloud infrastructure environment. In such an environment, a particular proxy key vault would typically be configured for a particular customer/PE/VCN/tenancy.

As illustrated in FIG. 6 and described above, in one or more embodiments, the different customers shown therein share a common identity provider that is directly accessible from the customer's overlay/on-premise environment while being accessible from a cloud environment KMS substrate via a whitelist.

In one or more embodiments, an individual customer operates an identity service within the customer's overlay. In other embodiments, an operator operating as a higher-level customer to the cloud environment, e.g., as a private label cloud (PLC) operator, groups a set of PLC end-user customers within a single overlay, and then the PLC operator provides a shared identity service or a comparable third-party functionality.

In one or more embodiments, the EKM proxy service is provided as compute nodes that include an understanding, through metadata, of the external keys, together with the EKM proxy service's provider-agnostic application program interface, shim layer, or library that allows communication with the identity service and with the PE/VCN.

In one or more embodiments, proxy key vaults are tenancy-specific. The EKM proxy service can be provided within the environment as a multi-tenant service, wherein the environment can include one deployment of the EKM proxy service for use by more than one different customers.

The above are provided by way of example; in accordance with various embodiments, the various features described herein can be configured to be shareable by multiple customers or configured for use a single customer, depending on how the operator sets up their environment to meet the particular needs (e.g., SLAs, security) of their customers.

In one or more embodiments, the system 604 may include more or fewer components than the components illustrated in FIG. 6. The components illustrated in FIG. 6 may be local to or remote from each other. The components illustrated in FIG. 6 may be implemented in software and/or hardware. Each component may be distributed over multiple applications and/or machines. Multiple components may be combined into one application and/or machine. Operations described with respect to one component may instead be performed by another component.

In an embodiment, system 604 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

Figures 7, 8:
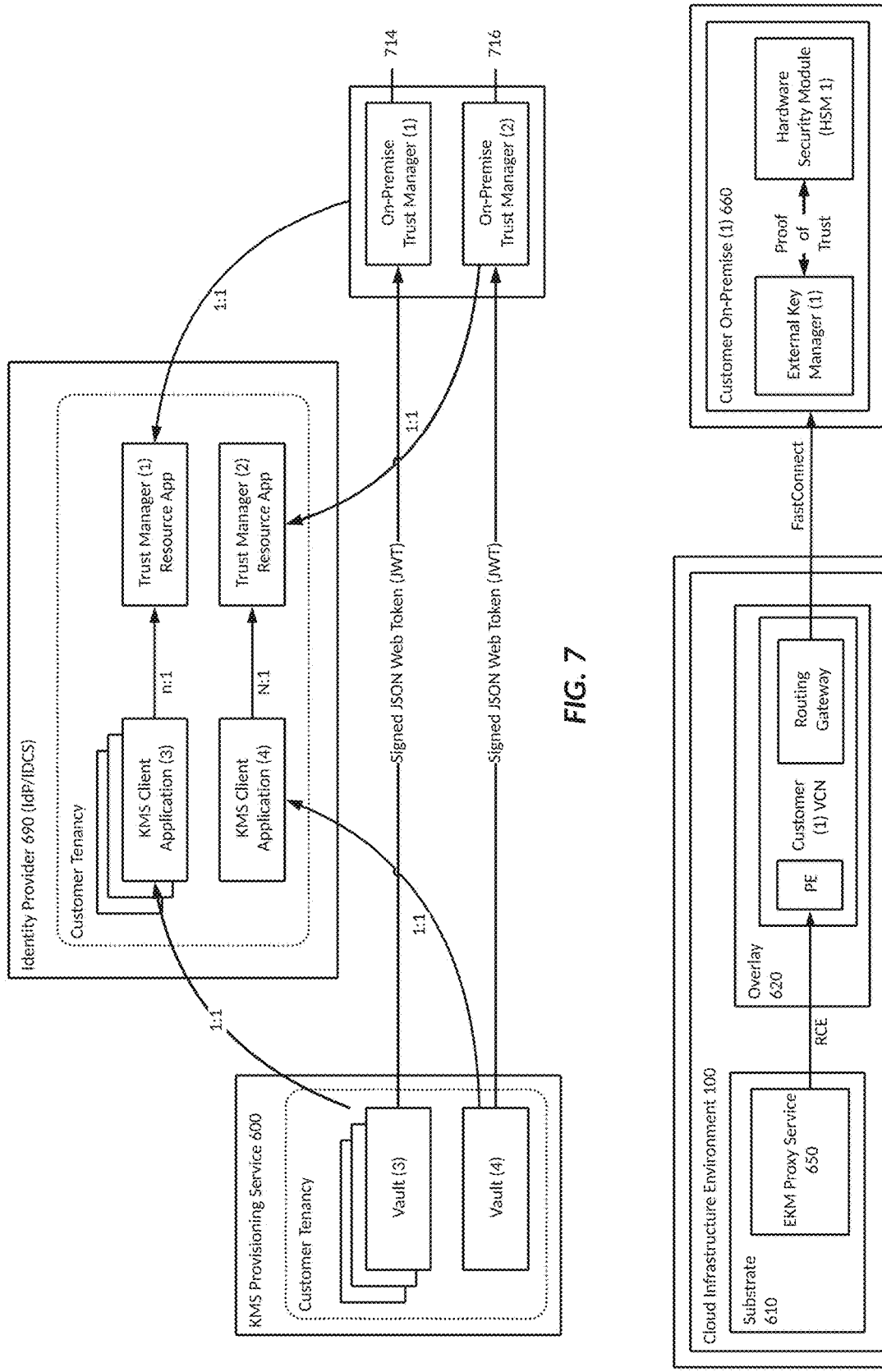
FIG. 7 illustrates the relationship between a key management service vault and an identity service application in accordance with one or more embodiments.
FIG. 8 illustrates configuring a private endpoint for use with an external key management proxy service and a customer on-premise environment in accordance with one or more embodiments.

FIG. 7 illustrates the relationship between a key management service vault and an identity service application in accordance with one or more embodiments. In one or more embodiments, a vault in KMS 600 has a 1:1 relationship with client application in the identity service 690. The external key manager also has a 1:1 relationship with the resource application in the identity service 690. A customer may have multiple vaults communicating to the same external key manager. Accordingly, there can be multiple client applications in the identity service 690 that are bound to the same server application. This creates an N:1 relationship between the client applications and the server applications in the identity service 690.

In one or more embodiments, an on-premise trust manager 714, 716 operates to securely store keys with a high root of trust. During creation of a vault in the KMS, in addition to regular vault details, such as name and vault type, customers may provide the confidential client application credentials that they would have received when creating the same in the identity service, e.g., IDCS. The EKM proxy service can encrypt these client credentials using a KMS realm secret and persist the encrypted client credentials in the KMS datastore in an encrypted manner. The realm secret can be seeded, for example, inside a trust manager module of the VM at the time of bootstrapping the region. The EKM proxy service, during a data plane call, uses these client credentials to obtain a communication credential from the identity service. The same communication credential may then be presented during outbound calls to the external key manager APIs. The external key manager validates the presented communication credential before granting access to the resource.

In accordance with an embodiment, to avoid fetching the communication credential during subsequent KMS data plane calls, the EKM proxy service may keep these communication credentials pre-fetched in a cache of within the EKM proxy service.

FIG. 8 illustrates configuring a private endpoint for use with an external key management proxy service and a customer on-premise environment to establish an authenticated communication path between the virtual vault and the EKM in accordance with one or more embodiments. When a region is initially bootstrapped, an endpoint service is created from a substrate EKM fleet hosts. Once in operation, a private endpoint can be created using the endpoint service. Once a private endpoint is created in a customer's VCN, the endpoint service enables RCE on the private endpoint. The endpoint service then obtains a NAT IP address that models the customer private IP address of the external key manager.

5. CONFIGURING AND USING A KEY MANAGEMENT SERVICE

Figure 9:
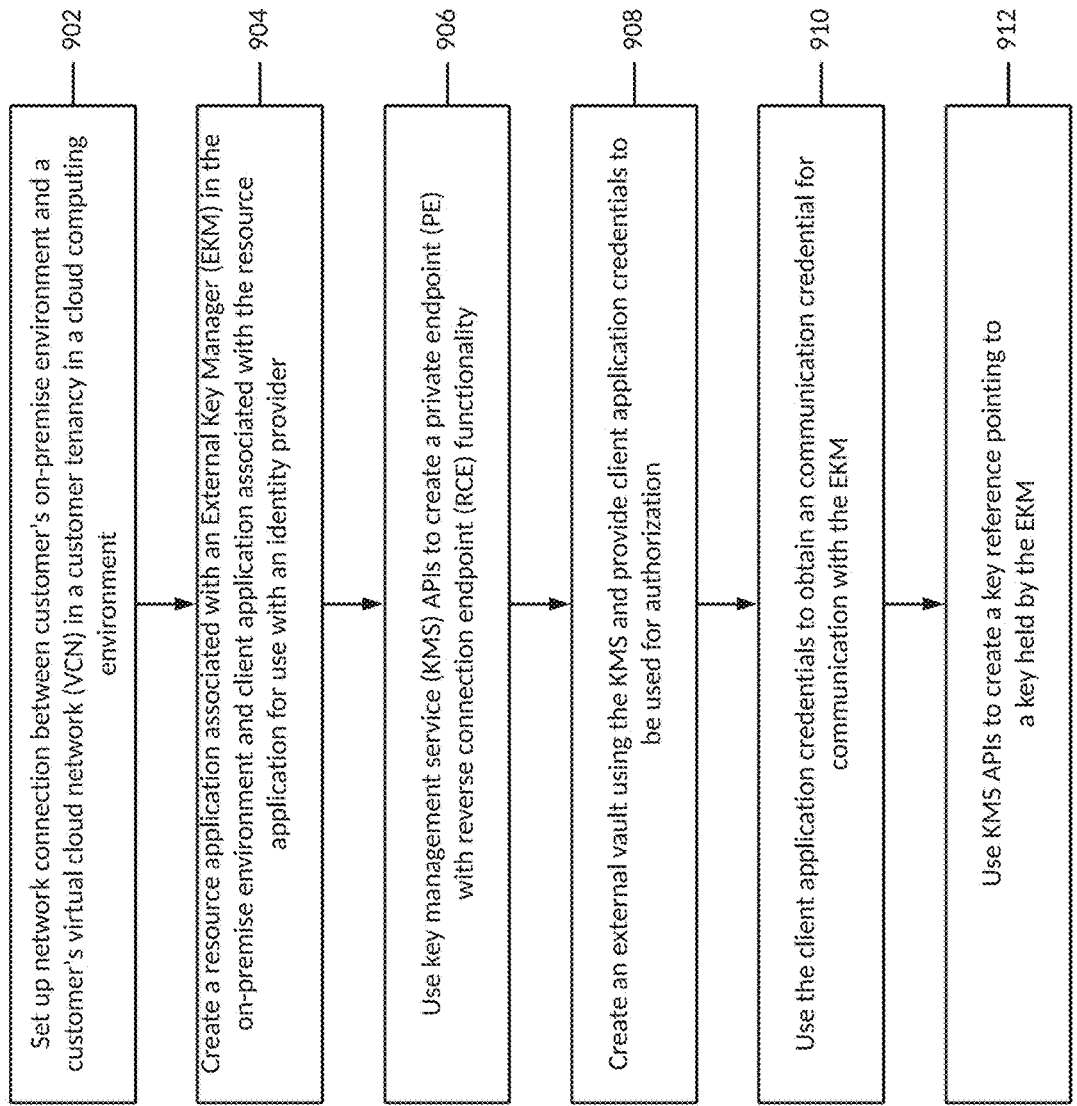
FIG. 9 illustrates an example process for configuring and using a key management service with a cloud infrastructure environment in accordance with one or more embodiments.

FIG. 9 illustrates an example set of operations for configuring a key management service (KMS) to operate in coordination with an external key manager (EKM) in accordance with one or more embodiments. One or more operations illustrated in FIG. 9 may be modified, rearranged, or omitted. Accordingly, the particular sequence of operations illustrated in FIG. 9 should not be construed as limiting the scope of one or more embodiments.

In an embodiment, the system sets up a network between a customer's on-premise environment and a virtual cloud network of the customer in a customer tenancy in a cloud environment (Operation 902). For example, the customer may configure a private connection, such as a virtual private network (VPN), that uses the public Internet. Alternatively, the customer may configure a dedicated private VPN that bypasses the public Internet, for example, when the customer's on-premise environment is co-located with the cloud computing environment infrastructure. The network is configured such that the customer's VCN can communicate with an EKM on the customer's on-premise environment.

In an embodiment, the system creates a resource application associated with an External Key Manager (EKM) in the on-premise environment and a client application associated with the resource application for use with an identity service (Operation 904). The system creates a confidential resource application that models the customer's EKM using information provided by the customer, such as name, primary audience, and scopes. The system may enable the resource application to grant client credentials. The system stores a public/private key pair with the resource application.

The system also creates a confidential client application that models a vault in the cloud environment KMS. During the creation of the client application, the customer binds the client application to the resource server application using specific scopes and target audience. The system creates a client ID to identify the client application and generates a client secret for the client application. The client ID, the client secret, or both may be used as a client credential.

Figure 10:
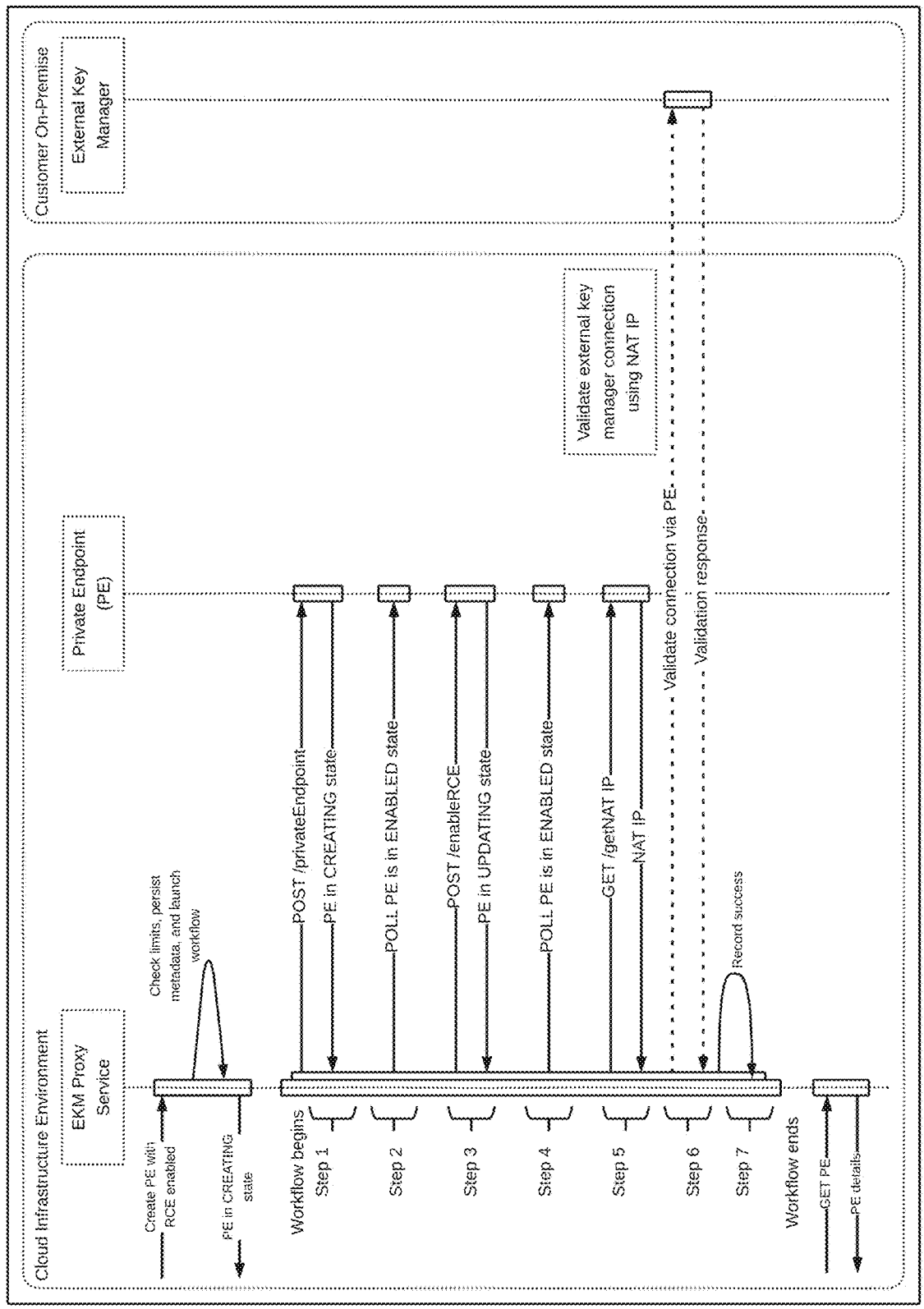
FIG. 10 illustrates a sequence diagram or process flow associated with creating a private endpoint with reverse connection functionality as a reverse connection endpoint in accordance with one or more embodiments.

In an embodiment, the system uses key management service (KMS) APIs to create a private endpoint (PE) with reverse connection endpoint (RCE) functionality (Operation 906). An example of a sequence flow for creating a private endpoint is shown in FIG. 10. The request may be received via an application program interface (API) used by the KMS. The request may include request parameters such as the following: a compartment ID where the private endpoint is to be created, for example, the customer's compartment; a subnet ID where the private endpoint is to be placed; and a display name for the PE. The request parameters may also include information identifying the EKM vendor and vendor metadata describing polymorphic implementation for the security provider or vendor. The request parameters may also include an IP address of the EKM, e.g., a static IP or fully qualified domain name (FQDN) of the external key manager. The request parameters may also include a Certificate Authority (CA) bundle used to authenticate the external hardware security module in the EKM.

Figure 11:
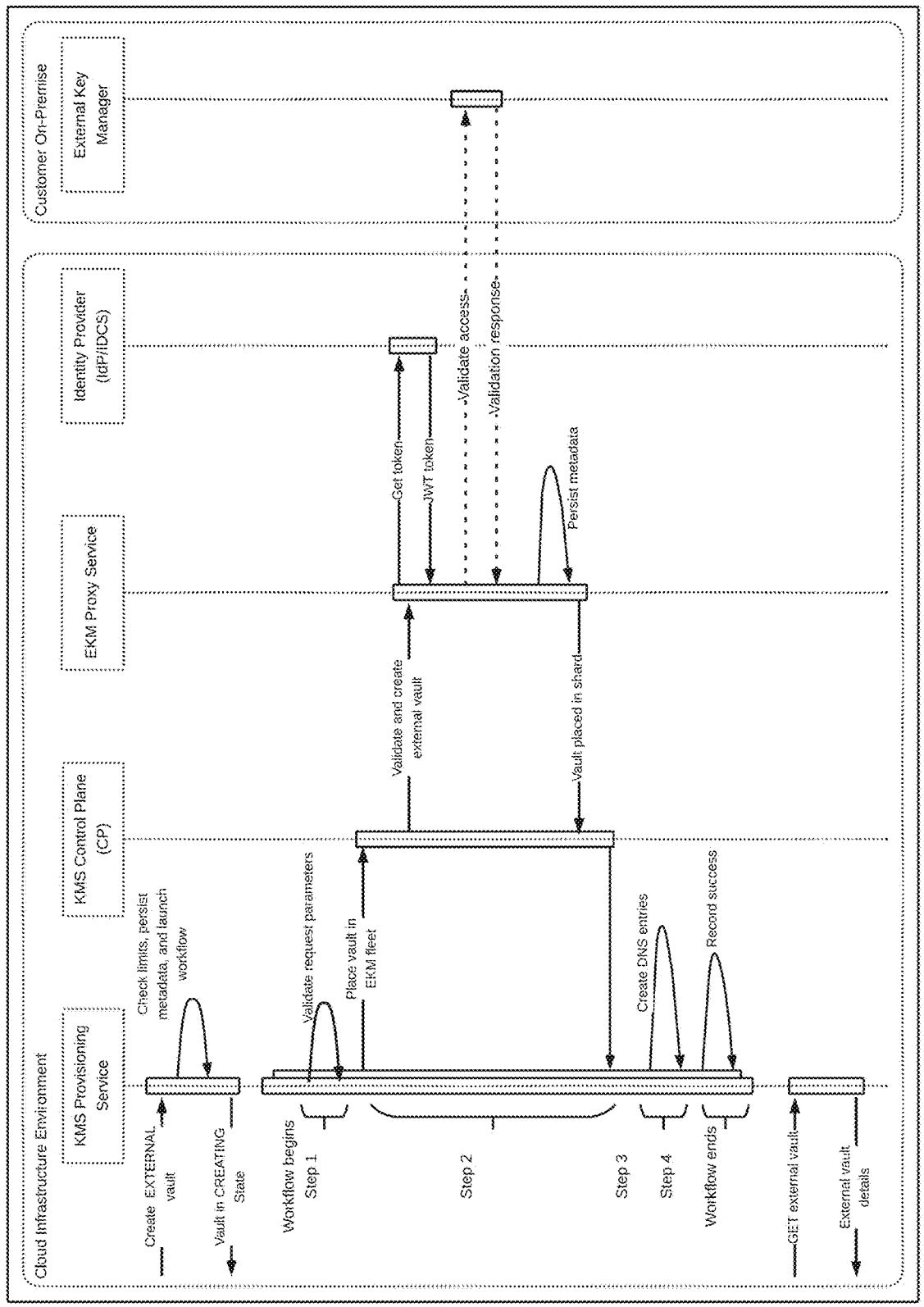
FIG. 11 illustrates a sequence diagram or process flow associated with creating a proxy key vault in accordance with one or more embodiments.

In an embodiment, the system creates a proxy key vault using the KMS (Operation 908). An example of a sequence flow for creating a proxy key vault is shown in FIG. 11. The system may receive a request to create a proxy key vault via a vault creation API used by the KMS. The request may specify the private endpoint and the virtual cloud network to connect to the proxy key vault. The request to create the proxy key vault may include one or more parameters and/or payloads, such as the following: a compartment ID for the compartment where the proxy key vault is to be created, e.g., the requesting customer's compartment; a private endpoint ID to be associated with the proxy key vault; information associated with the identity service, such as the vendor and a URL. The request may also include the ID of the client application to be used for authorization and the client application secret. The system may place a new proxy key vault structure in the EKM fleet. The system may encrypt the client credential using a realm secret in the KMS and store the encrypted client credential in the vault.

In one or more embodiments, the system validates access to the EKM from the proxy key vault, for example, by accessing a health check endpoint of the external hardware security module in the EKM to verify connectivity using the communication credential. The system may create DNS entries to the proxy key vault responsive to successful access validation.

Figure 12:
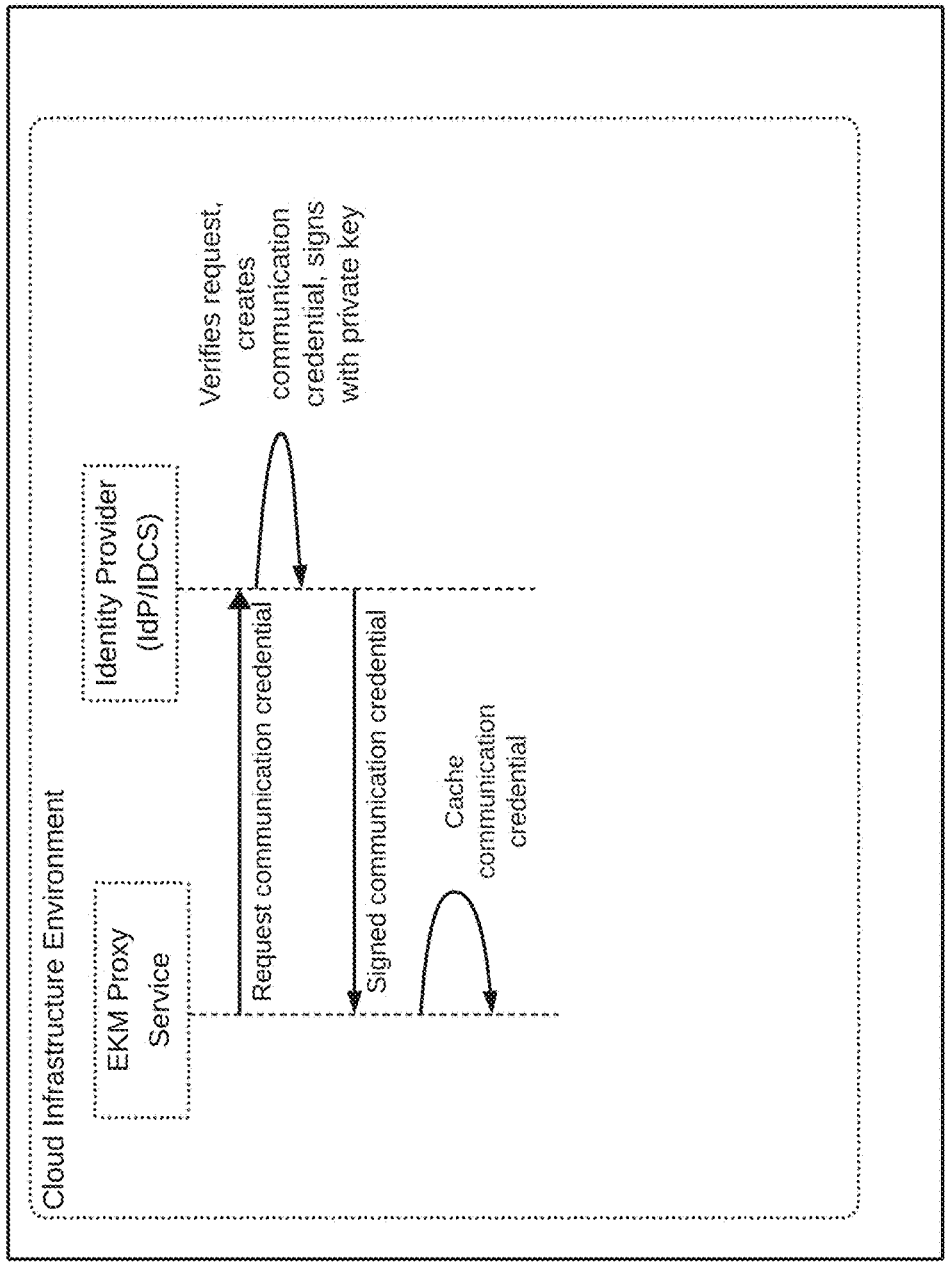
FIG. 12 illustrates a sequence diagram or process flow associated with creating a communication credential in accordance with one or more embodiments.

In an embodiment, the system uses the client application credentials to obtain a communication credential for communication with the EKM (Operation 910). An example of a sequence flow obtaining a communication credential is shown in FIG. 12. The EKM proxy may request a communication credential from the identity service. The request may include a client credential for the client application (app) associated with the vault where the EKM proxy is installed. The system may verify the request. For example, the identity service may verify that the client credential is associated with the client application in the identity service.

In one or more embodiments, the identity service creates the communication credential and signs the communication credential. The communication credential may be, for example, a bearer token, a JSON web token (JWT), an opaque token, a SML assertion, or an OAuth token. The identity service may identify the resource application in the identity service that is mapped with the client application. The identity service may retrieve the private key of the public/private key pair associated with the resource application and use the private key to sign the communication credential.

In one or more embodiments, identity service returns the signed communication credential to the EKM proxy. The EKM proxy may cache the signed communication credential for future use in communicating with the EKM associated with the resource application and client application that created the communication credential.

Figure 13:
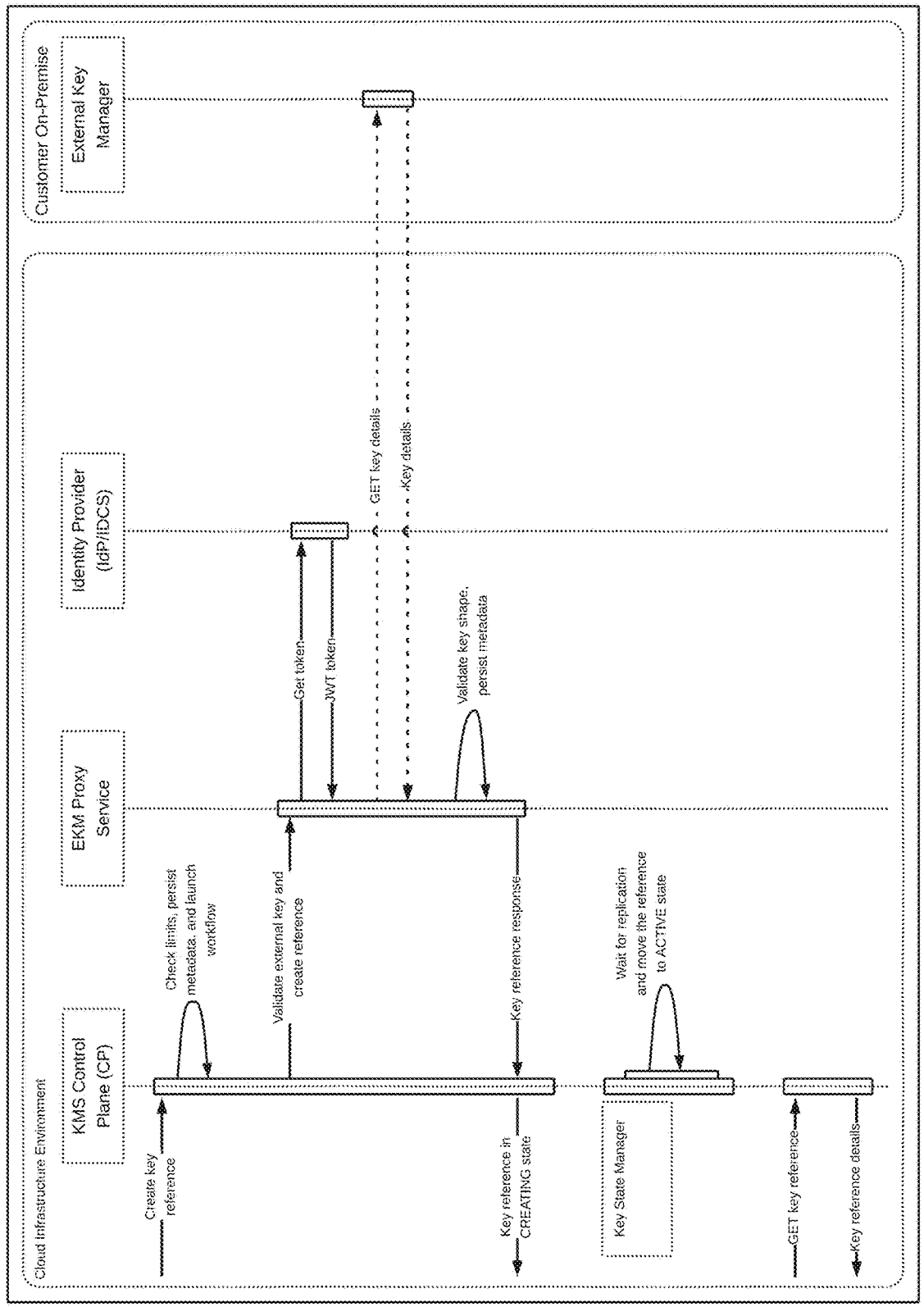
FIG. 13 illustrates a sequence diagram or process flow associated with creating and using an external key reference in accordance with one or more embodiments.

In one or more embodiments, the system uses KMS APIs to create a key reference pointing to an external key held by the EKM (Operation 912). An example of a sequence flow for creating a key reference is shown in FIG. 13. The external key is in a usable state, meaning that the external key is in an active state and has permissions to perform AES encrypt/decrypt cryptographic operations. The system may receive, via a KMS API, a request to create a key reference. The request may include one or more parameters associated with the key reference, including the following: a vault ID for the vault where the key reference is to be created; a name for the key reference; a size of the external key associated with the key reference; and a key ID of the external key in the external key manager.

The system may generate a key reference, for example, a unique string, that will be mapped to the external key. The system may request a communication credential from the identity service or may retrieve a cached communication credential. The system may request that the EKM validate the external key that is to be mapped to the key reference. The request for validation may include the communication credential.

In one or more embodiments, the EKM validates the external key according to the communication credential and confirms the existence and active state of the external key. Responsive to successful validation, the system may store the key reference and a mapping of the key reference to the ID of the external key in the metadata of the EKM proxy.

6. EXAMPLE EMBODIMENT

A detailed example is described below for purposes of clarity. Components and/or operations described below should be understood as one specific example that may not be applicable to certain embodiments. Accordingly, components and/or operations described below should not be construed as limiting the scope of any of the claims.

FIG. 10 illustrates a sequence diagram or process flow associated with creating a private endpoint (PE) with reverse connection functionality as a reverse connection endpoint (RCE) in accordance with one or more embodiments. One or more operations illustrated in FIG. 10 may be modified, rearranged, or omitted. Accordingly, the particular sequence of operations illustrated in FIG. 10 should not be construed as limiting the scope of one or more embodiments.

In one or more embodiments, the EKM proxy service receives a request to create a PE with RCE that is within a customer's virtual cloud network (VCN) and privately connected to the customer's on-premise EKM. The request may be received via an application program interface (API) used by the KMS.

In one or more embodiments, the EKM proxy creates a private endpoint according to the request and validates the connection between the PE and the EKM.

Creating the private endpoint and reverse connection endpoint may be asynchronous steps that callers can use as a poll mechanism to see if these resources have been created. When the private endpoint has been created and enables a reverse connection endpoint, a network address translation (NAT) IP address can be allocated that models the external key manager to communicate with.

FIG. 11 illustrates a sequence diagram or process flow associated with creating a proxy key vault in a KMS in accordance with one or more embodiments. One or more operations illustrated in FIG. 11 may be modified, rearranged, or omitted. Accordingly, the particular sequence of operations illustrated in FIG. 11 should not be construed as limiting the scope of one or more embodiments.

In one or more embodiments, the system receives a request to create a proxy key vault at the KMS provisioning service via an API from the customer. The system may instruct the KMS control plane to create a proxy key vault in the EKM fleet, responsive to a valid request. The KMS control plane may place a new proxy key vault in the EKM fleet and validate access to the EKM. The system may create one or more DNS entries to the proxy key vault responsive to successful access validation.

FIG. 12 illustrates a sequence diagram or process flow associated with creating a communication credential in accordance with one or more embodiments. One or more operations illustrated in FIG. 12 may be modified, rearranged, or omitted. Accordingly, the particular sequence of operations illustrated in FIG. 12 should not be construed as limiting the scope of one or more embodiments.

In one or more embodiments, the EKM proxy requests a communication credential from the identity service. The request may include a client credential for the client application (app) associated with the vault where the EKM proxy is installed.

In one or more embodiments, the identity service verifies the request. The identity service may verify that the client credential is associated with the client application in the identity service.

In one or more embodiments, the identity service creates the communication credential and signs the communication credential with the private key. The identity service may identify the resource application in the identity service that is mapped with the client application. The identity service may retrieve the private key of the public/private key pair associated with the resource application and use the private key to sign the communication credential.

In one or more embodiments, identity service returns the signed communication credential to the EKM proxy. The EKM proxy may cache the signed communication credential for future use in communicating with the EKM associated with the resource application and client application that created the communication credential.

FIG. 13 illustrates a sequence diagram or process flow associated with creating and using an external key reference in accordance with one or more embodiments. One or more operations illustrated in FIG. 13 may be modified, rearranged, or omitted. Accordingly, the particular sequence of operations illustrated in FIG. 13 should not be construed as limiting the scope of one or more embodiments.

Prior to the illustrated sequence, the customer has created an external key in the EKM. The external key is in a usable state, meaning that the external key is in an active state and has permissions to perform AES encrypt/decrypt cryptographic operations. The customer may use an API used by the KMS to create a key reference that maps to the external key.

In one or more embodiments, the system receives, at the KMS control plane via the API, a request to create a key reference. The KMS control plane may request external key validation and reference creation from the EKM proxy. Responsive to the request, the EKM proxy requests and receives a communication credential from the identity service (or uses a cached credential) and then requests key details corresponding to the key ID included in the key reference creation request, using the communication credential, from the EKM.

The EKM may return the key details or may validate received key details against the external key in the EKM, responsive to validating the communication credential. The EKM may confirm the existence and active state of the external key to the EKM proxy.

The EKM proxy may store the key reference and a mapping of the key reference to the ID of the external key in the metadata of the EKM fleet.

Figure 14:
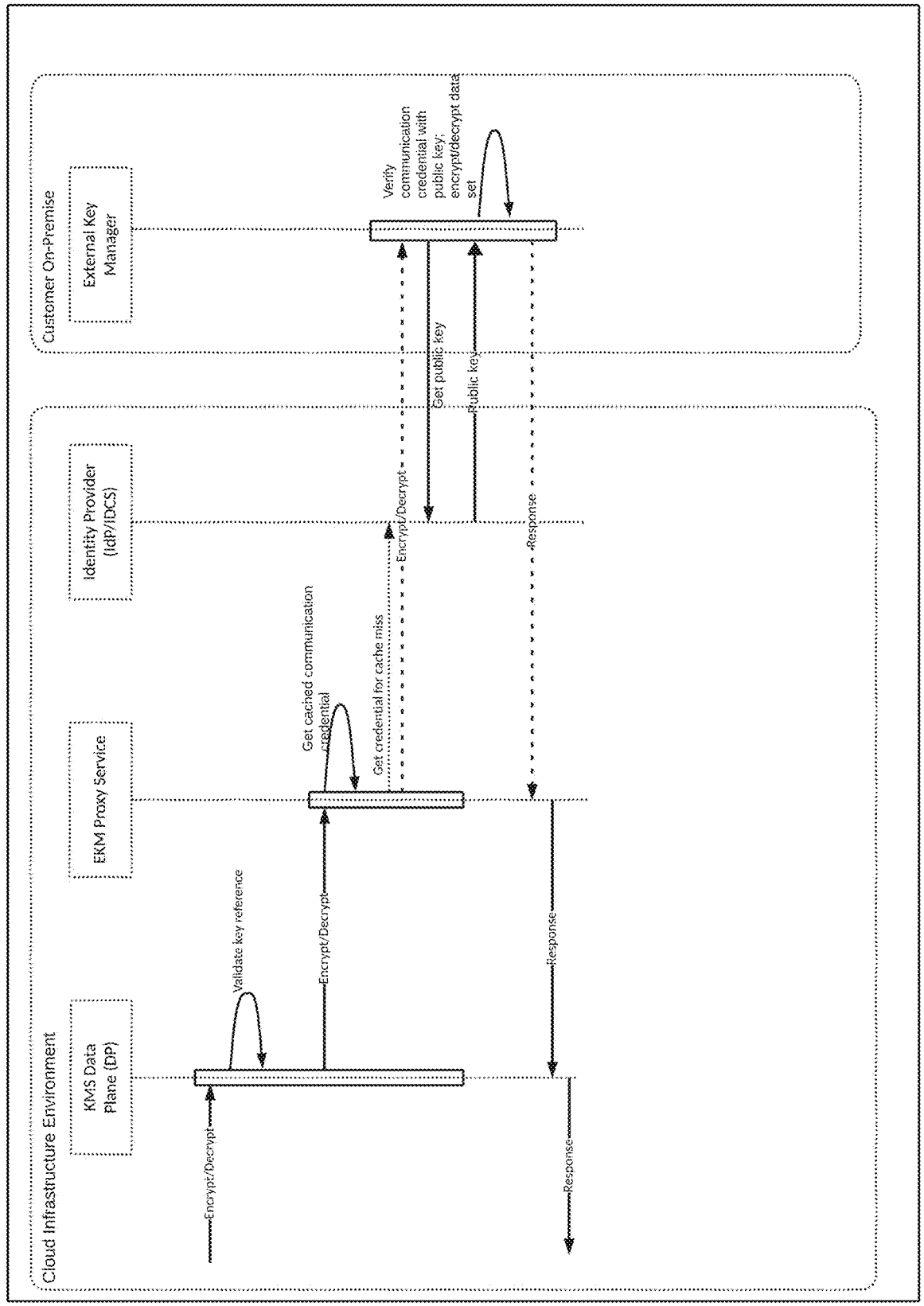
FIG. 14 illustrates a sequence diagram or process flow associated with using an external key reference to encrypt or decrypt data in accordance with one or more embodiments.

FIG. 14 illustrates a sequence diagram or process flow associated with using an external key reference to encrypt or decrypt data in accordance with one or more embodiments. One or more operations illustrated in FIG. 14 may be modified, rearranged, or omitted. Accordingly, the particular sequence of operations illustrated in FIG. 14 should not be construed as limiting the scope of one or more embodiments.

In one or more embodiments, the system receives a request for a cryptographic operation, e.g., encrypt or decrypt, at the KMS data plane. The request includes a reference to a cryptographic key to use for the cryptographic operation and a data payload that will be the operand of the cryptographic operation.

The system may validate the key reference, for example, by checking for a valid mapping of the key reference to an active key. The system may forward the request to the EKM proxy based on determining that the key reference is for an external key.

The EKM proxy may retrieve the cached communication credential, if available. If there is no cached communication credential, or if the cached communication credential has expired, the EKM proxy requests a new communication credential from the identity service.

The EKM proxy sends a request for the cryptographic operation and the communication credential to the EKM.

The EKM proxy may use an API call to the EKM for the cryptographic operation and include the communication credential in a header.

The EKM requests the public key from the identity service when the request is received. The identity service returns the public key associated with the EKM to the EKM.

In one or more embodiments, the EKM validates the communication credential using the public key. The EKM may determine that the communication credential is signed and that the signature is included in the communication credential. The EKM may verify the signature with the public key corresponding to the private key used to sign the communication credential. When the communication credential is valid, the EKM performs the requested cryptographic operation.

The EKM may validate additional information associated with the communication credential. For example, the EKM may verify that the communication credential token is issued for a specific external key manager application or audience, as defined by the resource application in the identity service. The EKM may verify that the communication credential is issued for a specific scope, as defined by the resource application in the identity service. The EKM may verify that the communication credential has not expired.

In one or more embodiments, the system returns the response to the cryptographic operation through the EKM proxy and KMS data plane to the requesting entity.

In one or more embodiments, the EKM proxy may transmit a heartbeat signal to the EKM to determine a status of the EKM or an external key in the EKM. When the heartbeat signal indicates that the EKM is not available, for example, due to a power or network outage, the EKM proxy may raise an alert that the requested cryptographic operation cannot be performed due to the unavailability of the EKM. Similarly, if the heartbeat signal indicates that the external key is unavailable or invalid, e.g., expired, the EKM proxy may raise an alert that the requested cryptographic operation cannot be performed. Responsive to the alert, the KMS may emit a status code, such as standard HTTP status code, with a cause-specific structured message to state the reason of failure.

7. PRACTICAL APPLICATIONS, ADVANTAGES, AND IMPROVEMENTS

Conventional external key management systems require that the proxy within the cloud computing environment be able to communicate with an external key manager using calls and requests in the format specified by the vendor of the EKM and/or of the hardware security module on the EKM. Thus, an EKM proxy may be able to communicate with just one type of EKM or HSM.

In contrast, one or more embodiments include a provider-agnostic API that allows one EKM proxy to communicate with any EKM or HSM, regardless of vendor. A provider-agnostic application program interface, shim layer, or library allows the customer to integrate third-party identity providers or identity management processes that control the authentication and authorization of the EKM proxy service when communicating with the customer's on-premise external key manager. The provider-agnostic API is offered by the cloud service provider and implemented by the vendor of the EKM. The customer can choose the external key management service to use.

Conventional key management systems that enable access to an EKM require that a customer have separate services for internal key management and for external key management. In contrast, one or more embodiments allow one service to use both internal and "external" vaults. The same call can be used to access the internal and external vaults, and the system routes the call to the appropriate vault.

Unlike conventional key management systems that enable access to an EKM, one or more embodiments use a two-legged authorization to authenticate and authorize communication between an EKM proxy and an EKM. This improves security when using external cryptographic keys and supports multiple tenants using the same EKM proxy.

8. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner that might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions that, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of patent protection, and what is intended by the applicants to be the scope of patent protection, is the literal and equivalent scope of the set of claims that issue from this application, in the specific form that such claims issue, including any subsequent correction.

What is claimed is:

1. One or more non-transitory computer readable media comprising instructions which, when executed by one or more hardware processors, cause performance of operations comprising:
 receiving, by an identity service from a proxy key vault, a token request for a communication credential, wherein the token request is substantiated based at least on a client credential stored in association with the proxy key vault, wherein the proxy key vault is located within a cloud computing environment;
 verifying, by the identity service, the client credential, wherein verifying the client credential comprises:
  determining, by the identity service, that the proxy key vault is associated with a client application implemented by the identity service;

verifying that the client credential is associated with the client application associated with the proxy key vault;
responsive to verifying the client credential, generating, by the identity service, the communication credential, wherein generating the communication credential comprises:
identifying, by the identity service, a resource application implemented by the identity service that has a mapping with the client application;
retrieving, by the identity service, a private key of a public/private key pair associated with the resource application;
signing, by the identity service, the communication credential using the private key; and
transmitting, by the identity service to the proxy key vault, the communication credential;
wherein the communication credential is used to substantiate cryptographic operation requests to an external key manager mapped to the resource application, wherein the external key manager is located outside of the cloud computing environment.

2. The non-transitory media of claim 1, the operations further comprising:
creating, by the identity service, the resource application, wherein the resource application is associated with the external key manager wherein configured to access an external hardware device configured to store external cryptographic keys;
creating, by the identity service, the client application, wherein the client application is associated with the client credential;
creating, by the identity service, a mapping between the resource application and one or more client applications comprising the client application; and
creating, by a key management service (KMS), the proxy key vault, wherein creating the proxy key vault comprises storing the client credential in association with the proxy key vault.

3. The non-transitory media of claim 1, the operations further comprising:
receiving, by the proxy key vault, a first request to perform a cryptographic operation using an external cryptographic key;
obtaining, by the proxy key vault, the communication credential generated by the identity service; and
transmitting, by the proxy key vault to the external key manager, a second request to perform the cryptographic operation using the external cryptographic key, wherein the second request is substantiated based at least on the communication credential.

4. The non-transitory media of claim 3, wherein obtaining the communication credential comprises retrieving, by the proxy key vault, the communication credential from a cache.

5. The non-transitory media of claim 4, the operations further comprising:
determining at least one of: that the communication credential in the cache is expired or that the cache does not contain a communication credential; and
responsive to the determining, requesting, by the proxy key vault, a second communication credential from the identity service.

6. The non-transitory media of claim 3, the operations further comprising:

receiving, by the identity service from the external key manager, a third request for a public key of the public/private key pair associated with the resource application;
responsive to verifying, by the identity service, that the resource application is mapped to the client application, transmitting the public key; and
receiving, by the proxy key vault, encrypted or decrypted data based on performance of the cryptographic operation using the external cryptographic key.

7. The non-transitory media of claim 1, further comprising a second client application implemented by the identity service and mapped to the resource application; and wherein the client application is mapped to a first vault of a cloud computing entity and the second client application is mapped to a second vault of the cloud computing entity.

8. The non-transitory media of claim 1, wherein the client credential comprises at least one of a client application identifier and a client secret.

9. A method comprising:
receiving, by an identity service from a proxy key vault, a token request for a communication credential, wherein the token request is substantiated based at least on a client credential stored in association with the proxy key vault, wherein the proxy key vault is located within a cloud computing environment;
verifying, by the identity service, the client credential, wherein verifying the client credential comprises:
determining, by the identity service, that the proxy key vault is associated with a client application implemented by the identity service;
verifying that the client credential is associated with the client application associated with the proxy key vault;
responsive to verifying the client credential, generating, by the identity service, the communication credential, wherein generating the communication credential comprises:
identifying, by the identity service, a resource application implemented by the identity service that has a mapping with the client application;
retrieving, by the identity service, a private key of a public/private key pair associated with the resource application;
signing, by the identity service, the communication credential using the private key; and
transmitting, by the identity service to the proxy key vault, the communication credential;
wherein the communication credential is used to substantiate cryptographic operation requests to an external key manager mapped to the resource application, wherein the external key manager is located outside of the cloud computing environment; and
wherein the method is performed by at least one device including a hardware processor.

10. The method of claim 9, further comprising:
creating, by the identity service, the resource application, wherein the resource application is associated with the external key manager wherein configured to access an external hardware device configured to store external cryptographic operation keys;
creating, by the identity service, the client application, wherein the client application is associated with the client credential;
creating, by the identity service, a mapping between the resource application and one or more client applications comprising the client application; and creating, by a key management service (KMS), the proxy key vault, wherein creating the proxy key vault comprises storing the client credential in association with the proxy key vault.

11. The method of claim 9, further comprising:
receiving, by the proxy key vault, a first request to perform a cryptographic operation using an external cryptographic key;
obtaining, by the proxy key vault, the communication credential generated by the identity service; and
transmitting, by the proxy key vault to the external key manager, a second request to perform the cryptographic operation using the external cryptographic key, wherein the second request is substantiated based at least on the communication credential.

12. The method of claim 11, wherein obtaining the communication credential comprises retrieving, by the proxy key vault, the communication credential from a cache.

13. The method of claim 12, further comprising:
determining at least one of: that the communication credential in the cache is expired or that the cache does not contain a communication credential; and
responsive to the determining, requesting, by the proxy key vault, a second communication credential from the identity service.

14. The method of claim 11, further comprising:
receiving, by the identity service from the external key manager, a third request for a public key of the public/private key pair associated with the resource application;
responsive to verifying, by the identity service, that the resource application is mapped to the client application, transmitting the public key; and
receiving, by the proxy key vault, encrypted or decrypted data based on performance of the cryptographic operation using the external cryptographic key.

15. A system comprising:
at least one device including a hardware processor;
the system being configured to perform operations comprising:
receiving, by an identity service from a proxy key vault, a token request for a communication credential, wherein the token request is substantiated based at least on a client credential stored in association with the proxy key vault, wherein the proxy key vault is located within a cloud computing environment;
verifying, by the identity service, the client credential, wherein verifying the client credential comprises:
determining, by the identity service, that the proxy key vault is associated with a client application implemented by the identity service;
verifying that the client credential is associated with the client application associated with the proxy key vault;
responsive to verifying the client credential, generating, by the identity service, the communication credential, wherein generating the communication credential comprises:
identifying, by the identity service, a resource application implemented by the identity service that has a mapping with the client application;
retrieving, by the identity service, a private key of a public/private key pair associated with the resource application;
signing, by the identity service, the communication credential using the private key; and
transmitting, by the identity service to the proxy key vault, the communication credential;
wherein the communication credential is used to substantiate cryptographic operation requests to an external key manager mapped to the resource application, wherein the external key manager is located outside of the cloud computing environment.

16. The system of claim 15, the operations further comprising:
creating, by the identity service, the resource application, wherein the resource application is associated with the external key manager wherein configured to access an external hardware device configured to store external cryptographic operation keys;
creating, by the identity service, the client application, wherein the client application is associated with the client credential;
creating, by the identity service, a mapping between the resource application and one or more client applications comprising the client application; and
creating, by a key management service (KMS), the proxy key vault, wherein creating the proxy key vault comprises storing the client credential in association with the proxy key vault.

17. The system of claim 15, the operations further comprising:
receiving, by the proxy key vault, a first request to perform a cryptographic operation using an external cryptographic key;
obtaining, by the proxy key vault, the communication credential generated by the identity service; and
transmitting, by the proxy key vault to the external key manager, a second request to perform the cryptographic operation using the external cryptographic key, wherein the second request is substantiated based at least on the communication credential.

18. The system of claim 17, wherein obtaining the communication credential comprises retrieving, by the proxy key vault, the communication credential from a cache.

19. The system of claim 18, the operations further comprising:
determining at least one of: that the communication credential in the cache is expired or that the cache does not contain a communication credential; and
responsive to the determining, requesting, by the proxy key vault, a second communication credential from the identity service.

20. The system of claim 17, the operations further comprising:
receiving, by the identity service from the external key manager, a third request for a public key of the public/private key pair associated with the resource application;
responsive to verifying, by the identity service, that the resource application is mapped to the client application, transmitting the public key; and
receiving, by the proxy key vault, encrypted or decrypted data based on performance of the cryptographic operation using the external cryptographic key.

* * * * *